United States Patent
Mukundan

(10) Patent No.: US 10,904,435 B2
(45) Date of Patent: Jan. 26, 2021

(54) BIOMETRICS TO LAUNCH A CAMERA APPLICATION

(71) Applicant: HEWLETT-PACKARD DEVELOPMENT COMPANY, L.P., Spring, TX (US)

(72) Inventor: Sudish Mukundan, San Diego, CA (US)

(73) Assignee: Hewlett-Packard Development Company, L.P., Sping, TX (US)

( * ) Notice: Subject to any disclaimer, the term of this patent is extended or adjusted under 35 U.S.C. 154(b) by 0 days.

(21) Appl. No.: 16/340,271

(22) PCT Filed: Feb. 3, 2017

(86) PCT No.: PCT/US2017/016496
§ 371 (c)(1),
(2) Date: Apr. 8, 2019

(87) PCT Pub. No.: WO2018/144014
PCT Pub. Date: Aug. 9, 2018

(65) Prior Publication Data
US 2019/0349534 A1 Nov. 14, 2019

(51) Int. Cl.
| | | |
|---|---|---|
| H04N 5/222 | (2006.01) | |
| H04N 5/232 | (2006.01) | |
| G06F 9/445 | (2018.01) | |
| G06F 21/32 | (2013.01) | |
| G06K 9/00 | (2006.01) | |
| H04M 1/725 | (2006.01) | |

(Continued)

(52) U.S. Cl.
CPC ....... *H04N 5/232411* (2018.08); *G06F 9/445* (2013.01); *G06F 21/32* (2013.01); *G06K 9/00087* (2013.01); *H04M 1/72522* (2013.01); *H04M 1/72569* (2013.01); *H04M 1/72577* (2013.01); *H04W 4/026* (2013.01); *H04W 52/0254* (2013.01)

(58) Field of Classification Search
CPC ................................ H04N 5/222; G06F 21/32
USPC ...................................................... 348/207.99
See application file for complete search history.

(56) References Cited

U.S. PATENT DOCUMENTS

| | | | |
|---|---|---|---|
| 9,015,640 B2 | 4/2015 | de Leon | |
| 9,076,008 B1 * | 7/2015 | Moy | ................... G06F 21/6281 |
| 9,372,978 B2 | 6/2016 | Dellinger et al. | |

(Continued)

FOREIGN PATENT DOCUMENTS

EP    2192519 A1    6/2010

OTHER PUBLICATIONS

All About the Innovative Fingerprint Sensor of Honor 5X, Feb. 19, 2016, <http://www.themobileindian.com/news/17779_All-about-the-innovative-Fingerprint-Sensor-of-Honor.

(Continued)

*Primary Examiner* — Anthony J Daniels
(74) *Attorney, Agent, or Firm* — Tong, Rea, Bentley & Kim LLC

(57) ABSTRACT

In example implementations, a method to launch a camera application from a mobile device is provided. The method includes receiving a biometric of a user. The orientation of the mobile device may also be detected. In response to the biometric and detecting that the mobile device is in a landscape orientation, the camera application is launched and the camera on the mobile device is activated.

18 Claims, 4 Drawing Sheets

(51) Int. Cl.
*H04W 4/02* (2018.01)
*H04W 52/02* (2009.01)

(56) References Cited

U.S. PATENT DOCUMENTS

| | | | |
|---|---|---|---|
| 9,560,282 B2 | 1/2017 | Brauer et al. | |
| 9,734,787 B2* | 8/2017 | Chang | G06F 21/32 |
| 2010/0138914 A1 | 6/2010 | Davis et al. | |
| 2012/0062757 A1* | 3/2012 | Schindler | H04N 5/232 |
| | | | 348/220.1 |
| 2013/0042209 A1* | 2/2013 | de Leon | G06F 3/017 |
| | | | 715/863 |
| 2014/0157402 A1* | 6/2014 | Boss | G06F 21/36 |
| | | | 726/19 |
| 2014/0210703 A1* | 7/2014 | Narasimhan | G06F 21/36 |
| | | | 345/156 |
| 2014/0232633 A1 | 8/2014 | Shultz | |
| 2015/0033231 A1* | 1/2015 | Wu | G06K 9/00087 |
| | | | 718/100 |
| 2015/0074615 A1* | 3/2015 | Han | H04L 63/0861 |
| | | | 715/863 |
| 2015/0135108 A1 | 5/2015 | Pope et al. | |
| 2015/0161837 A1* | 6/2015 | Smith | G07C 9/37 |
| | | | 340/5.53 |
| 2015/0319294 A1 | 11/2015 | Sudhir | |
| 2015/0324570 A1 | 11/2015 | Lee et al. | |
| 2016/0188023 A1 | 6/2016 | Chang et al. | |
| 2016/0301843 A1* | 10/2016 | Shultz | H04M 1/72522 |
| 2019/0238746 A1* | 8/2019 | VanBlon | H04N 5/23245 |

OTHER PUBLICATIONS

Touchy: Launch Apps With Specific Fingers Using Touch ID, Jan. 7, 2014, <http://www.idownloadblog.com/2014/01107/touchy-launch-apps-with-specific-fingers-using-touch-id/ >.

* cited by examiner

BIOMETRICS TO LAUNCH A CAMERA APPLICATION

BACKGROUND

Mobile devices, such as smart phones, include a camera. A camera application on the mobile device may be used to control and capture images using the camera on the mobile device.

DETAILED DESCRIPTION

The present disclosure discloses methods and devices for automatically launching a camera application. As discussed above, when a user wants to launch the camera application, the user wakes his or her mobile device. The user may have to enter a security password to access the device. Finally, the user selects the camera application to access the camera. Thus, a user may go through three steps when trying to activate the camera on the mobile device.

Many users use the camera on the mobile device to take pictures for everyday moments. Some moments may be fleeting and to capture the moment via a picture, the user may want to access the camera on the mobile device as quickly as possible. As a result, going through the above procedures to access the camera on the mobile device may take too long when wanting to quickly take a picture.

The examples of the present disclosure provide a method and a device that automatically launches a camera application and activates the camera on the mobile device with a single step. For example, when holding the mobile device in a proper orientation and using a biometric identification, the user may directly activate the camera application from a locked state of the mobile device. In other words, the security or passcode screen may be by-passed, as well as the home screen.

Figure 1:
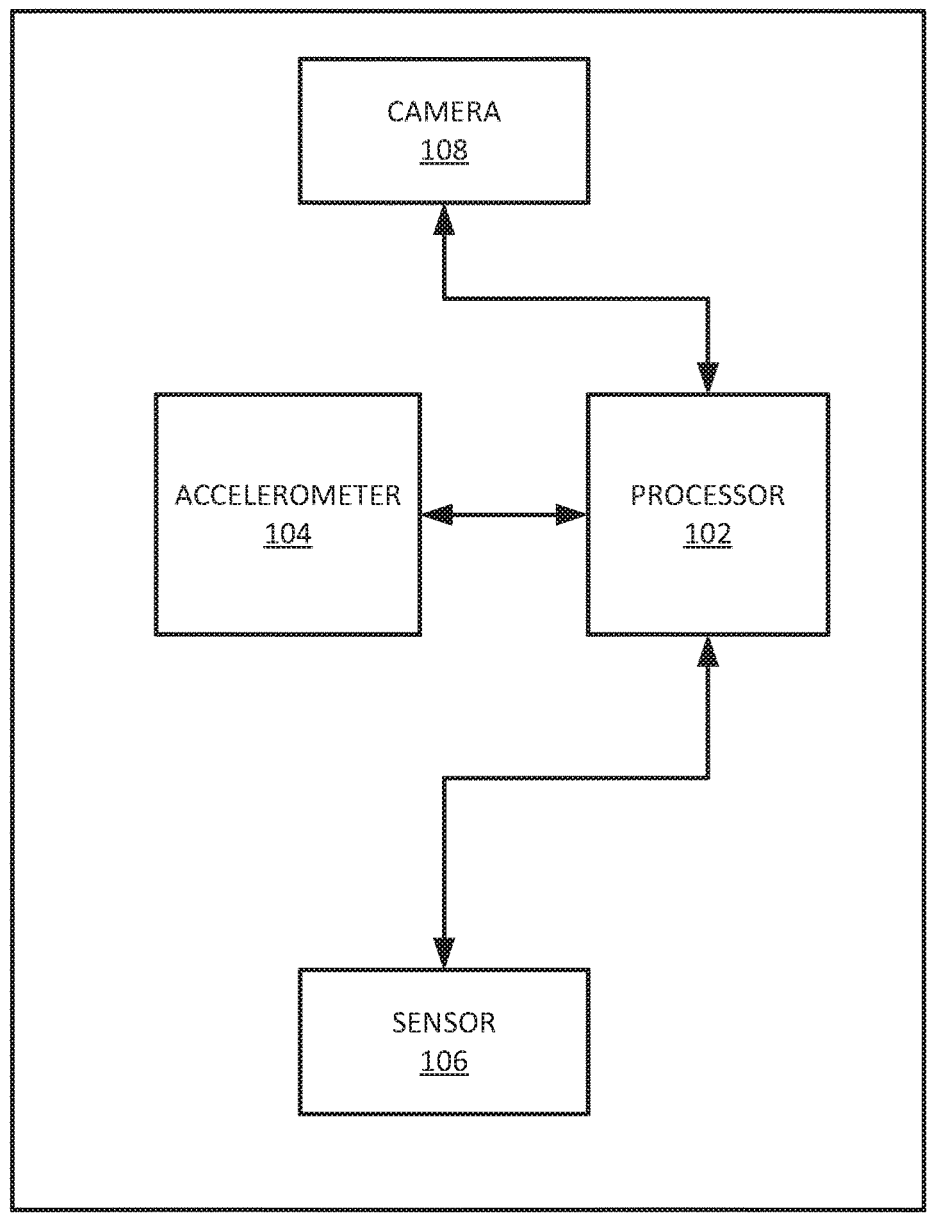
FIG. 1 is a functional block diagram of an example mobile device of the present disclosure.

FIG. 1 illustrates a block diagram of an example mobile device 100 of the present disclosure. The mobile device 100 may be a device, such as for example, a smart phone, a tablet computer, and the like.

In one example, the device 100 may include a processor 102, an accelerometer 104, a sensor 106 and a camera 108. The device 100 may include additional components and modules that are not shown for ease of explanation. For example, the device 100 may include a computer readable storage medium, or memory, that may include applications and instructions executed by the processor 102, such as a camera application that works with the camera 108.

In one implementation, the accelerometer 104 may be used to detect an orientation or movement of the mobile device 100. For example, the accelerometer 104 may be used to determine an orientation (e.g., a portrait orientation or a landscape orientation) of the mobile device 100. The accelerometer 104 may be in communication with the processor 102 and continuously provide orientation information of the mobile device 100 to the processor 102.

In one implementation, the sensor 106 may be used to receive an identification of a user. For example, the sensor 106 may be a biometric sensor that reads a fingerprint of the user. The user may store a fingerprint of any fingertip selected to automatically launch the camera application and activate the camera 108.

In one example, the user may store the fingerprint as an initial set-up process of the mobile device 100. For example, a memory of the mobile device 100 may store instructions associated with an initial set-up of the mobile device 100. The identification of the user, via a selected fingerprint of the user, may be assigned to the camera application during the initial set-up of the mobile device 100.

As a result, the ability of the mobile device 100 to automatically launch the camera application and activate the camera 108 may be stored as part of the operating system of the mobile device. In other words, the ability of the mobile device 100 to automatically launch the camera application and activate the camera 108 is not part of a third party application or separate application that is downloaded and executed on the mobile device 100. Rather the ability of the mobile device 100 to automatically launch the camera application and activate the camera 108 is stored with and used by the operating system (e.g., the software or computer implemented instructions associated with the operating system) during power up or initialization of the mobile device 100.

During the initial set-up, the user may be requested to place a fingertip on the sensor 106. The sensor 106 may read the fingerprint of the user and store it as the identification of the user and link the identification to the camera application and activation of the camera 108. At a later time, when the user wants to launch the camera application and activate the camera 108 from a locked mode of the mobile device 100, the user may place his or her fingertip on the sensor 106. The sensor 106 may read the fingerprint of the user and provide it to the processor 102.

In one implementation, the processor 102 may compare the fingerprint of the user read by the sensor 106 to the fingerprint that was stored as the identification of the user that is linked to the camera application during the initial set-up of the mobile device 100. In addition, the processor 102 has the orientation information from the accelerometer 104. When the processor 102 determines that the fingerprint matches the fingerprint stored as the identification of the user that is linked to the camera application and that the mobile device 100 is in a landscape orientation, the processor 102 may automatically launch the camera application and activate the camera 108. In other words, from a locked state or sleep mode of the mobile device 100, the processor 102 may wake the mobile device 100, by-pass any security, log-in, or password screens, launch the camera application and activate the camera 108. Said another way, when the fingerprint matches the fingerprint stored as the identification of the user that is linked to the camera application and the mobile device 100 is in a landscape orientation, the first image that will appear to the user will be the camera application when the mobile device 100 wakes up from a sleep mode or locked mode. The user will not see the passcode screen or the home screen, but rather see the camera application directly from a sleep mode or locked mode.

In one implementation, the user may use the same fingerprint used for identification to launch the camera application to perform a different function depending on the orientation of the mobile device 100. For example, during the initial set-up of the mobile device 100, the user may select a fingerprint to be stored in the memory of the mobile device 100 to automatically launch the camera application and to unlock the mobile device 100 to a home screen.

For example, the initial set-up process may use the selected fingerprint as the camera application when the mobile device 100 is in a landscape orientation. However, the initial set-up process may allow the user to select a different function for when the mobile device 100 is in a portrait orientation. The different function may be unlocking the mobile device 100 to the home screen, unlocking the mobile device 100 and launching a web browser, unlocking the mobile device 100 and launching an e-reader or e-book application, and the like.

Figure 2:
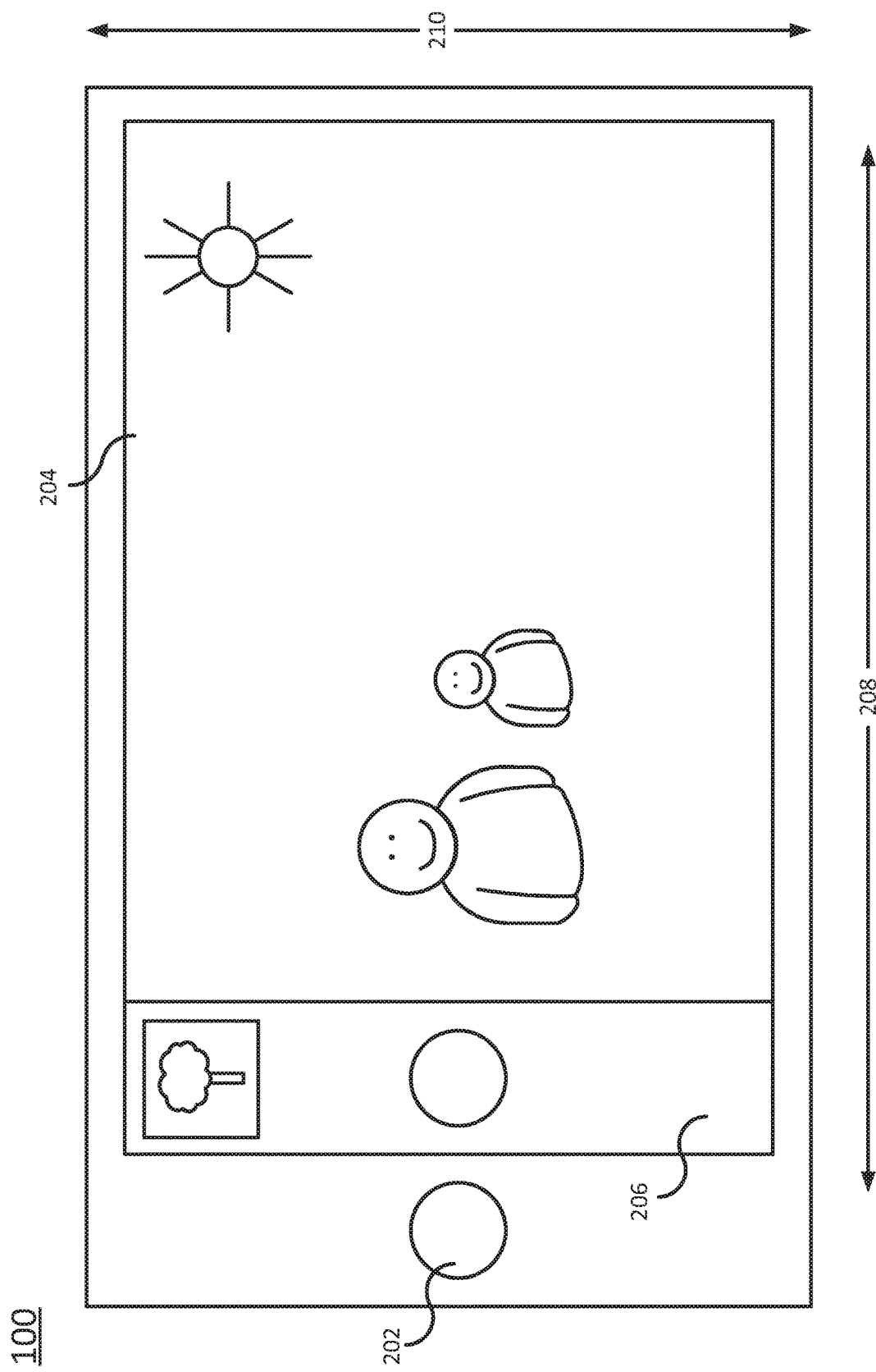
FIG. 2 is a block diagram of the example mobile device of the present disclosure.

FIG. 2 illustrates another block diagram of the mobile device 100. In one example, the mobile device 100 may have a home button 202. The sensor 106 may be located beneath the home button 202. In other examples, the sensor 106 may be located away from the home button 202 on another portion of the mobile device 100 (e.g., along the sides, on another portion of the housing, and the like).

FIG. 2 illustrates the mobile device 100 in a landscape orientation. For example, a length 208 of the mobile device 100 may be the "top" and "bottom" of the mobile device 100 and a width 210 may form the sides of the mobile device 100. The user may hold the mobile device 100 along the width 210 when in a landscape orientation. As noted above, the accelerometer 104 may detect when the mobile device 100 is rotated or oriented in a landscape orientation.

FIG. 2 illustrates a camera application 206 (implemented using processor executable instructions) that is shown in a display 204 of the mobile device 100. In one example, the mobile device 100 may be in a sleep mode or a lock mode. In other words, the display 204 may be blank or off. The user may place a fingertip with the fingerprint used for identification to automatically launch the camera application 206 on the home button 202 that is located over the sensor 106. In addition, when the mobile device 100 is held in a landscape orientation as shown in FIG. 2, the mobile device 100 may automatically launch the camera application 206 and activate the camera 108. In other words, any security screens or interfaces are by-passed and the home screen is by-passed. The camera application 206 would be the first image the user would see on the display 204 directly from a sleep mode or a locked mode of the mobile device 100.

In one implementation, although the security screen or passcode interface is by-passed, it should be noted that the mobile device 100 may not be unlocked when the camera application is automatically launched and the camera 108 is activated. For example, after the user is done taking a picture and presses the home button 202, the mobile device 100 may still request the user to enter security credentials (e.g., a password, another fingerprint associated with unlocking the mobile device 100, and the like) to unlock the mobile device 100 to the home screen. In other words, detecting the proper biometric of the user and holding the mobile device 100 in a landscape orientation may automatically launch the camera application and activate the camera 108 to allow the user to take a quick picture. However, launching the camera application and activating the camera 108 may not mean that the mobile device 100 is unlocked to allow the user to close the camera application and access other applications on the mobile device 100 without proper security credentials.

Figure 3:
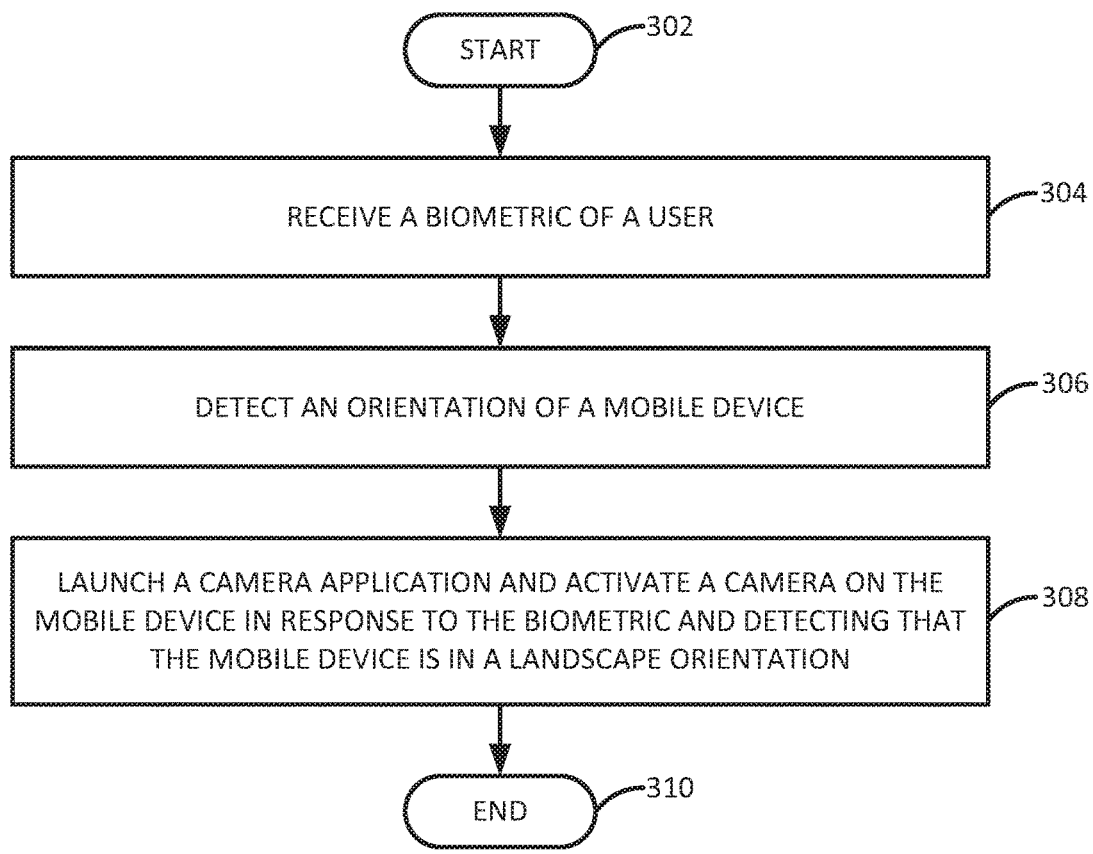
FIG. 3 is a block diagram of an example method for automatically launching a camera application on a mobile device.

FIG. 3 illustrates a flow diagram of an example method 300 for automatically launching a camera application. In one example, the method 300 may be performed by the processor 102 of the device 100 illustrated in FIGS. 1 and 2.

At block 302, the method 300 begins. At block 304, the method 300 receives a biometric of a user. In one implementation, the biometric of the user may be a fingerprint. For example, the user may place a fingertip on a biometric sensor of the mobile device 100 that can read the fingerprint of the user. The fingerprint of the user may be read by the biometric sensor.

At block 306, the method 300 detects an orientation of a mobile device. The orientation of the mobile device may be detected by an accelerometer within the mobile device that can detect and measure movement of the mobile device. The accelerometer may determine if the mobile device is in a landscape orientation or in a portrait orientation.

At block 308, the method 300 launches a camera application and activates a camera on the mobile device in response to the biometric and detecting that the mobile device is in a landscape orientation. For example, the biometric may be a fingerprint as noted in block 304. The fingerprint may be compared to a fingerprint that is stored in the memory of the mobile device.

In one example, the fingerprint stored in the memory of the mobile device may be stored during an initial set-up process of the mobile device. In other words, when the mobile device is initially activated and used for the first time, the mobile device may execute an initial set-up process to customize settings for the user. Part of the initial set-up process may be to store a fingerprint that can be used to automatically launch the camera application and activate the camera of the mobile device from a sleep mode or a locked state.

Notably, the ability to automatically launch the camera application with the stored fingerprint is part of the operating system. In other words, the ability to automatically launch the camera application is not a third party application or separate application that is downloaded onto the mobile device. As a result, the ability to automatically launch the camera application with the stored fingerprint may not be deleted from the mobile device. However, the ability to automatically launch the camera application may be turned on and off as part of the operating system settings.

Thus, when the fingerprint that is received matches the fingerprint that was stored during the initial set-up process and the mobile device is being held in a landscape orientation, the method 300 may automatically launch the camera application and activate the camera on the mobile device. In other words, from a sleep mode or a locked mode, the camera application may be the first image the user sees on the display of the mobile device. The password screens may be by-passed and the home screen may be by-passed.

In one example, when the mobile device is held in a portrait orientation and the fingerprint that is received matches the fingerprint that was stored during the initial set-up process, a different function may be executed. For example, the mobile device may automatically unlock and go to a home screen. In other words, the same fingerprint may be stored to execute two different applications or functions depending on the orientation of the mobile device. At block 310, the method 300 ends.

Figure 4:
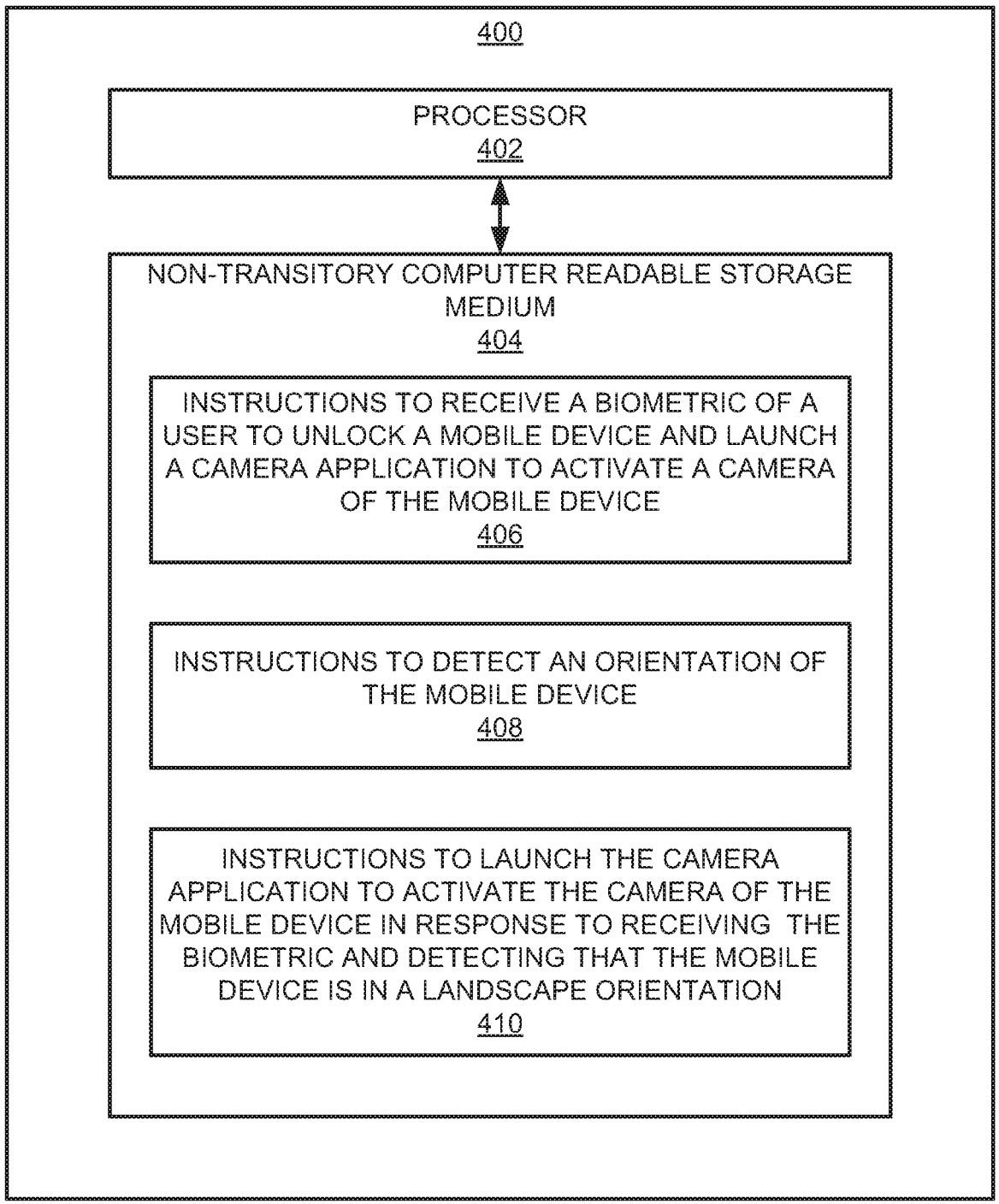
FIG. 4 is a block diagram of an example non-transitory computer readable medium storing instructions executed by a processor.

FIG. 4 illustrates an example of an apparatus 400. In one example, the apparatus may be the device 100. In one example, the apparatus 400 may include a processor 402 and a non-transitory computer readable storage medium 404. The non-transitory computer readable storage medium 404 may be encoded with instructions 406, 408 and 410 that when executed by the processor 402, cause the processor 402 to perform various functions.

In one example, the instructions 406 may include instructions to receive a biometric of a user to unlock a mobile device and launch a camera application to activate a camera of the mobile device. The instructions 408 may include instructions to detect an orientation of the mobile device. The instructions 410 may include instructions to launch the camera application to activate the camera of the mobile device in response to receiving the biometric and detecting that the mobile device is in a landscape orientation.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   assigning a biometric of a user to a camera application during an initial set-up of a mobile device, wherein the biometric of the user that is assigned to the camera application is stored as part of instructions of an operating system of the mobile device that are executed during power up of the mobile device;
   receiving the biometric of the user;
   detecting an orientation of the mobile device; and
   launching the camera application and activating a camera on the mobile device, while the mobile device is in a locked state, in response to the biometric and to detecting that the mobile device is in a landscape orientation.

2. The method of claim 1, wherein the receiving the biometric of the user comprises:
   receiving a fingerprint of the user that is associated with the camera application.

3. The method of claim 1, wherein the biometric of the user is also used to unlock the mobile device to a home screen when the mobile device is detected to be in a portrait orientation.

4. The method of claim 1, further comprising:
   receiving a security credential different than the biometric; and
   unlocking the mobile device to a home screen in response to receiving the security credential.

5. The method of claim 4, wherein the security credential is a second biometric of the user.

6. The method of claim 1, wherein the camera application is launched when a display of the mobile device is off.

7. A mobile device, comprising:
   a sensor to receive an identification of a user;
   an accelerometer to detect an orientation of the mobile device;
   a camera;
   a memory to store the identification of the user, wherein the identification of the user is assigned to a camera application during an initial set-up of the mobile device and is stored as part of instructions of an operating system of the mobile device that are executed during power up of the mobile device; and
   a processor in communication with the sensor, the accelerometer and the camera to launch the camera application and activate the camera, while the mobile device is in a locked state, in response to detecting that the mobile device is in a landscape orientation and that the identification of the user is assigned to activate the camera application.

8. The mobile device of claim 7, wherein the sensor comprises a biometric sensor.

9. The mobile device of claim 8, wherein the identification comprises a fingerprint of the user that is received by the biometric sensor.

10. The mobile device of claim 7, wherein the identification of the user is also used to unlock the mobile device to a home screen when the mobile device is detected to be in a portrait orientation.

11. The mobile device of claim 7, wherein the processor is further to unlock the mobile device to a home screen in response to receiving a security credential different than the identification.

12. The mobile device of claim 11, wherein the security credential comprises a second biometric of the user received by the sensor.

13. The mobile device of claim 7, further comprising:
   a display, wherein the camera application is launched when the display is off.

14. A non-transitory computer readable storage medium encoded with instructions executable by a processor, the non-transitory computer-readable storage medium comprising:
   instructions to assign a biometric of a user to a camera application during an initial set-up of a mobile device, wherein the biometric of the user that is assigned to the camera application is stored as part of instructions of an operating system of the mobile device that are executed during power up of the mobile device;
   instructions to receive the biometric of the user to launch the camera application to activate a camera of the mobile device;
   instructions to detect an orientation of the mobile device; and
   instructions to launch the camera application to activate the camera of the mobile device, while the mobile device is in a locked state, in response to receiving the biometric and to detecting that the mobile device is in a landscape orientation.

15. The non-transitory computer readable storage medium of claim 14, wherein the biometric of the user comprises a fingerprint.

16. The non-transitory computer readable storage medium of claim 14, comprising:
   instructions to unlock the mobile device in response to receiving the biometric and detecting that the mobile device is in a portrait orientation.

17. The non-transitory computer readable storage medium of claim 14, further comprising:
   instructions to receive a security credential different than the biometric; and
   instructions to unlock the mobile device to a home screen in response to receiving the security credential.

18. The non-transitory computer readable storage medium of claim 14, wherein the camera application is launched when a display of the mobile device is off.

* * * * *